United States Patent
DiBella

(10) Patent No.: US 11,554,452 B1
(45) Date of Patent: Jan. 17, 2023

(54) ROBOTIC SMART CARRIER NEST

(71) Applicant: The Gillette Company LLC, Boston, MA (US)

(72) Inventor: Paul DiBella, Pembroke, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/530,635

(22) Filed: Nov. 19, 2021

(51) Int. Cl.
*B23P 19/04* (2006.01)
*B23Q 7/14* (2006.01)
*B23P 21/00* (2006.01)

(52) U.S. Cl.
CPC ............ *B23P 19/04* (2013.01); *B23Q 7/1442* (2013.01); *B23P 21/004* (2013.01)

(58) Field of Classification Search
CPC ......... Y10T 29/53435; Y10T 29/53548; Y10T 29/53961; B25B 11/02; B23Q 7/1436; B23Q 7/1442; B23Q 7/1452; B23Q 7/1426; B23P 19/04; B23P 21/004
See application file for complete search history.

(56) References Cited

U.S. PATENT DOCUMENTS

| | | | | |
|---|---|---|---|---|
| 5,044,541 A | * | 9/1991 | Sekine | B23Q 7/1442 228/49.1 |
| 5,347,700 A | * | 9/1994 | Tominaga | B23Q 7/1442 29/430 |
| 6,021,660 A | * | 2/2000 | Pike | F02M 69/48 29/799 |
| 6,687,971 B2 | * | 2/2004 | Nakamura | B62D 65/18 29/430 |
| 2008/0000068 A1 | * | 1/2008 | Savoy | B23P 21/004 29/430 |
| 2009/0260549 A1 | * | 10/2009 | Lauzier | B65D 19/44 108/55.3 |
| 2011/0054694 A1 | * | 3/2011 | Munk | B64F 5/10 700/275 |
| 2012/0145849 A1 | * | 6/2012 | Yeum | B25B 11/02 248/220.21 |

* cited by examiner

*Primary Examiner* — Matthew P Travers
(74) *Attorney, Agent, or Firm* — John M. Lipchitz

(57) ABSTRACT

Techniques for conveyor systems that integrate robotic smart carrier nests whose configurations are dynamically changed based on product geometry are provided. In one embodiment, a system can include a modular nest configured to hold product during assembly. The modular nest includes a first actuator comprising a first pair of gripping arms that open and close in a first direction based on a first signal. The modular nest also includes a second actuator comprising a second pair of gripping arms that open and close in a second direction based on a second signal. The first signal and the second signal are based on a geometry of the product. Further, the first direction and the second direction are different directions.

11 Claims, 9 Drawing Sheets

ROBOTIC SMART CARRIER NEST

FIELD OF THE INVENTION

This application relates to conveyor systems that integrate robotic smart carrier nests whose configurations are dynamically changed based on wireless communication control signals that provide information indicative of respective geometries of products that are being moved via the conveyor system.

BACKGROUND OF THE INVENTION

Assembly manufacturing operations are used to assemble a product based on forming an assembly line to convey the product (e.g., a conveyor line) through a number of assembly stations in order to fully assemble the final product. The conveyor line can include either manual or robotic assembly operation stations. In some assembly operations there is some form of carrier (e.g., pallet or structure) that serves as the start of the assembly. Then, as the carrier moves along the conveyor line, the carrier obtains the required products inserted at their respective stations to form the finished assembly.

The carriers are attached to the conveyor and are built, and custom designed specifically to hold a specific product. Therefore, if a different product assembly is to go through the conveyor line, the carriers need to be changed manually in order to hold/house that specific product as it goes down the assembly line operations.

SUMMARY OF THE INVENTION

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that employ a smart nest carrier A product assembly system is provided that comprises a conveyor track configured to move a platform, a rechargeable power source mounted to the platform, and a control unit mounted to the platform and powered by the rechargeable power source. The product assembly system also comprises a modular nest mounted to the platform and configured to secure or manipulate a product during assembly. The control unit sends, to the modular nest, a signal based on a geometry of the product. Further, the modular nest secures or manipulates the product based on the signal.

The modular nest comprises a first actuator with a first pair of gripping arms that open and close in a first direction based on the signal from the control unit. In an example, the first pair of gripping arms maintain positioned within the platform. In another example, the first pair of gripping arms do not contact the conveyor track.

In some implementations, the modular nest comprises a second actuator with a second pair of gripping arms that open and close in a second direction transverse to the first direction based on the signal from the control unit.

In an example, the first actuator is a linear servo actuator. The product assembly system can further include a wireless transmitter that sends data to a control circuit. The modular nest can include a wireless receiver that receives, from a transmitter, a master signal regarding the geometry of the product to be assembled.

In an example, the product is a first product, the signal is a first signal, the geometry is a first geometry, and the modular nest is further configured to secure or manipulate a second product during assembly. According to this example, the control unit sends a second signal to the modular nest based on a second geometry of the second product. The first geometry and the second geometry are different geometries. Further, the modular nest secures or manipulates the second product based on the second signal.

According to another example, the modular nest is a first modular nest, the product is a first product, the signal is a first signal, the geometry is a first geometry, and the product assembly system further comprises a second modular nest mounted to the platform and configured to secure or manipulate a second product during the assembly. The control unit sends, to the second modular nest, a second signal based on a second geometry of the second product. The first product and the second product comprise different geometries, and the second modular nest secures or manipulates the second product based on the second signal.

In another embodiment, a modular nest configured to hold product during assembly is provided. The modular nest includes a first actuator comprising a first pair of gripping arms that open and close in a first direction based on a first signal. The modular nest also includes a second actuator comprising a second pair of gripping arms that open and close in a second direction based on a second signal. The first signal and the second signal are based on a geometry of the product. Further, the first direction and the second direction are different directions.

The modular nest can also include a first pair of linear slides and a second pair of linear slides. The first pair of linear slides are operatively attached to the first pair of gripping arms and configured to guide the first pair of gripping arms in the first direction. The second pair of linear slides are operatively attached to the second pair of gripping arms and configured to guide the second pair of gripping arms in the second direction. The first direction is transverse the second direction.

In an example, the first actuator comprises a first stroke distance and the second actuator comprises a second stroke distance. The first stroke distance and the second stroke distance are different distances.

The modular nest can be secured to a platform of a conveyor. Further, the first pair of gripping arms and the second pair of gripping arms maintain positioned within the platform. Additionally, the first pair of gripping arms and the second pair of gripping arms do not contact the conveyor.

Also provided is a method that includes determining, by a controller comprising a processor, a geometry of a product that is determined to be scheduled for an assembly process. The method also includes generating, by the controller, a control signal for securing or manipulating the product on a conveyor system based on the geometry of the product. Further, the method includes transmitting, by the controller, the control signal to a modular nest, wherein the modular nest secures or manipulates the product based on the control signal.

According to an implementation, the transmitting includes transmitting the control signal as a broadcast signal to a plurality of modular nests, including the modular nest. The broadcast signal comprises information indicative of an identification of the modular nest and is able to be retransmitted by another modular nest of the plurality of modular nests based on the control signal, transmitted by the controller, not being received at the modular nest.

In some implementations, the transmitting can include transmitting first instructions to control movement of a first pair of gripping arms. Further, the transmitting can include transmitting second instructions to control movement of a second pair of gripping arms.

Elements described in the disclosed systems can be embodied in different forms such as a computer-implemented method, a computer program product, or another form.

DETAILED DESCRIPTION OF THE INVENTION

Figure 1:
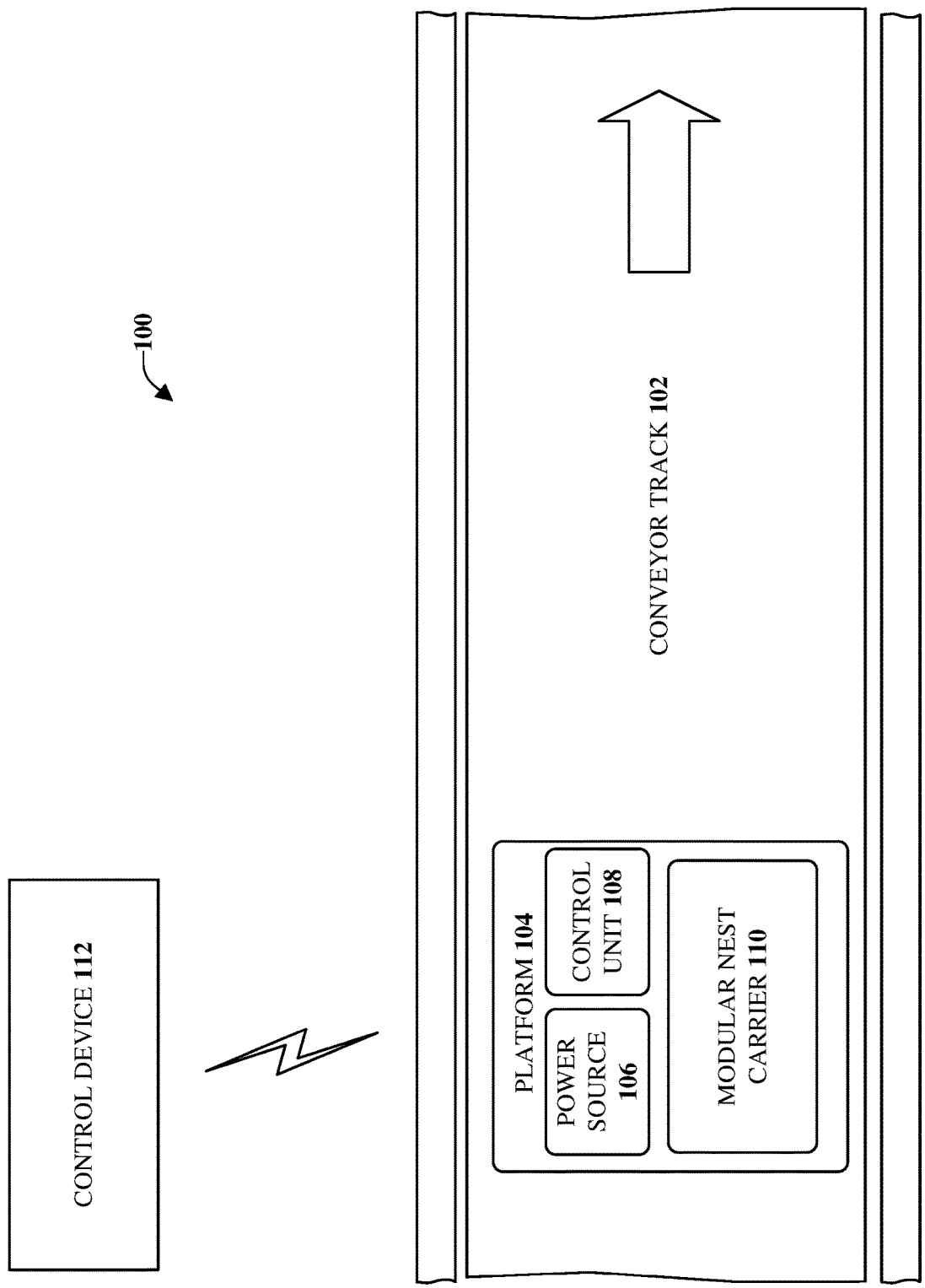
FIG. 1 illustrates an example, non-limiting, product assembly system in accordance with one or more embodiments.

The following detailed description is merely illustrative and is not intended to limit embodiments and/or application or uses of embodiments. Furthermore, there is no intention to be bound by any expressed or implied information presented in the preceding sections or in the Detailed Description section.

The disclosed subject matter is directed to robotic smart carrier nests that are controlled via one or more wireless control signals to dynamically and adaptively change configuration based on a geometry of one or more products to be conveyed along a conveyor system via the robotic smart carrier nests. The smart carrier nests are to be mounted to a platform of a conveyor track. The configuration of the smart carrier nests changes in order to secure or manipulate a product currently undergoing assembly. As assembly of a first product completes, the smart carrier nest can be reused for a second product, which can have the same geometry as the first product or can have a different geometry. When the second product has a different geometry than the first product, the configuration of the smart carrier nest can be changed automatically, without manual intervention or manual configuration of the smart carrier nest, which can increase processing efficiency of the system.

As used herein, the terms "component," "system," "platform," "interface," and the like, refer to and include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As used herein, the term "processor" refers to a device or machine that executes machine/computer executable instructions or components stored in memory. A processor as used herein includes, but is not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of equipment. A processor can also be implemented as a combination of computing processing units.

"Memory" as used herein refers to mechanism(s) used to retain information, such as executable instructions or components. As used herein, terms such as "store," "storage,"

"data store," data storage," "database," and substantially any other information storage element relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates an example, non-limiting, product assembly system 100 in accordance with one or more embodiments. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

The product assembly system 100 includes a conveyor track 102 configured to move one or more platforms, illustrated is a single platform 104 for purposes of simplicity. The conveyor track 102 can be in the form of a belt or chain. According to some implementations, the conveyor track 102 can be a single belt conveyor system or a multiple belt conveyor system (e.g., a twin belt conveyor system).

The conveyor track 102 and platform 104 can be associated with an assembly process. The product or other objects to be conveyed can be arranged in relation to the conveyor track 102 via a carrying means, such as the platform 104. The product is placed on or within the platform 104 and moved along the conveyor track 102 from a first location (e.g., a starting point) to a second location (e.g., an ending point). Between the first location and the second location, the platform 104 can be indexed at one or more workstations in order for assembly of the product to be performed at the respective workstations.

Included on the platform 104 is a rechargeable power source 106, a control unit 108, and a modular nest carrier 110. The rechargeable power source 106 can include one or more rechargeable batteries. In another example, the rechargeable power source 106 can be a quick-change plug type battery (e.g., quick-change battery pack). According to some implementations, the rechargeable power source 106 can be recharged remotely via one or more inductive charging stations positioned along the product assembly system 100 and/or the conveyor track 102.

The modular nest carrier 110 is mounted to the platform 104 and can be configured to secure or manipulate a product during assembly. For example, the control unit 108 can transmit to the modular nest carrier 110, a signal based on a geometry of the product. The signal can be transmitted via a communication protocol, such as Wi-Fi, for example. Based on the signal, the modular nest carrier 110 can secure and/or manipulate the product. The signal from the control unit 108 can be based on one or more signals received from a control device 112. In some implementations, in the absence of receipt of signals from the control device 112, the control unit can receive one or more signals from other control units associated with other platforms on the conveyor track, which will be discussed in further detail with respect to FIG. 7 below.

As the product (and modular nest carrier 110) is moved along the conveyor track 102, the product can undergo one or more operations at one or more workstations. In order to perform operations at various workstations, the product might be manipulated based on turning the product or otherwise manipulating the product. For example, the control unit 108 can provide instructions to the modular nest carrier 110 related to the movement or manipulation of the product. Upon or after assembly of the product is completed, the modular nest carrier 110 can be utilized for another product based on automatic configuration of the modular nest carrier 110.

At about the same time as the control device 112 is conveying the signal to the modular nest carrier 110 via the control unit 108, one or more other signals can be transmitted to other modular nests (not illustrated) of other platforms that are also mounted to the conveyor track 102. The different modular nests can hold the same product, or different products, depending on the products undergoing assembly. As such, the one or more signals transmitted to the modular nests can include respective instructions for control of the modular nest in order for the modular nest to secure and/or manipulate the product on or within the respective modular nest.

According to some implementations, the modular nest carrier 110 can perform one or more secondary operations in addition to, or in place of, securing and/or manipulation of the product. For example, the modular nest carrier 110 can be configured to apply a force to the product.

Figure 2:
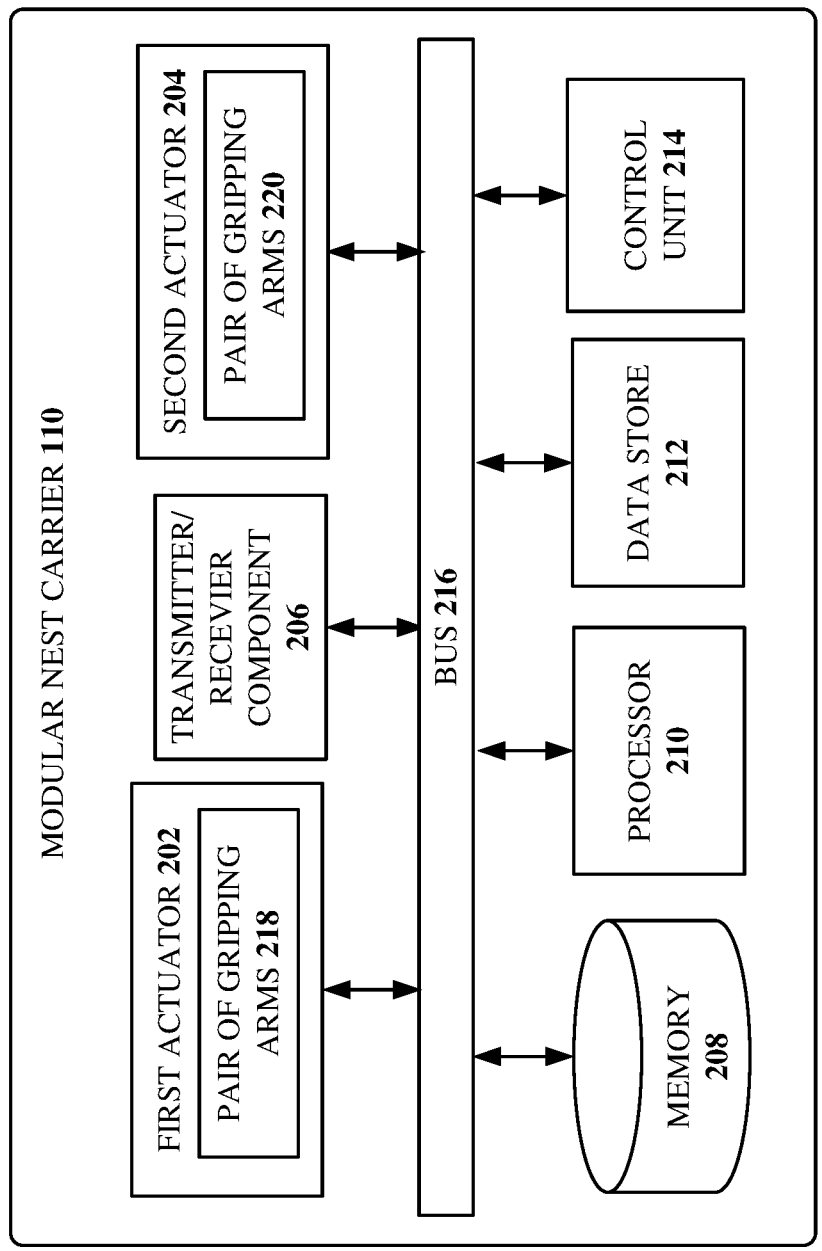
FIG. 2 illustrates a block diagram of an example, non-limiting, modular nest carrier in accordance with one or more embodiments described herein.

FIG. 2 illustrates a block diagram of an example, non-limiting, modular nest carrier 110 in accordance with one or more embodiments described herein. Repetitive description of like elements employed in other embodiments described herein is omitted for sake of brevity.

The modular nest carrier 110 can include a first actuator 202, a second actuator 204, a transmitter/receiver component 206, a memory 208, a processor 210, a data store 212, and a control unit 214. The memory 208 can store computer executable components and instructions. The processor 210 can facilitate execution of the instructions (e.g., computer executable components and corresponding instructions) by the first actuator 202, the second actuator 204, the transmitter/receiver component 206, and/or other components. As depicted, in some embodiments, one or more of the first actuator 202, the second actuator 204, the transmitter/receiver component 206, the memory 208, the processor 210, the data store 212, and/or the control unit 214 can be electrically, communicatively, and/or operatively coupled to one another via a modular nest carrier bus 216 that couples the various components to perform one or more functions of the modular nest carrier 110. The modular nest carrier bus 216 can be any of several types of bus structures that can further interconnect to a memory bus (with or without a memory controller), a peripheral bus, and a local bus using any of a variety of commercially available bus architectures.

The modular nest carrier 110 can be configured to hold, secure, and/or manipulate product during assembly. The first actuator 202 can include one or more pairs of gripping arms 218 that are configured to open and/or close in a first direction based on a first signal. For example, the first signal can be received from the control unit 214. The second actuator 204 can include one or more pairs of gripping arms 220 that are configured to open and close in a second direction based on a second signal, which can be received from the control unit 214. For example, the first and the second signal can be based on a geometry of a product. According to some implementations, the first direction and the second direction can be different directions. For example, the first direction is transverse the second direction.

The first pair of gripping arms 218 and the second pair of gripping arms 220 are configured to maintained positioned within the platform. Further, the first pair of gripping arms 218 and the second pair of gripping arms 220 do not contact the conveyor track.

A first pair of slides (not illustrated) can be operatively attached to the first pair of gripping arms and can be configured to guide the first pair of gripping arms in the first direction. Further, a second pair of slides (not illustrated) can be operatively attached to the second pair of gripping arms and can be configured to guide the second pair of gripping arms in the first direction. According to some implementations, the first pair of slides and the second pair of slides can be linear slides.

Although two actuators are illustrated and described, the disclosed embodiments are not limited to two actuators. Instead, more than two actuators can be utilized with the modular nest carrier 110. For example, in some implementations, the product being conveyed might have an irregular shape and, therefore, more portions of the product should be secured within gripping arms as discussed herein. Accordingly, more actuators and/or gripping arms can be included with the modular nest carrier 110. When a product that does not require the multiple contact points is being conveyed by the modular nest carrier 110, the extra actuators and/or gripping arms can be retained in a retracted position (e.g., not being used to secure and/or manipulate the product).

According to some implementations, the modular nest carrier 110 or its gripping arms can perform one or more secondary operations. For example, a force can be applied to the product (e.g., via the actuators) to hold or house a particular structure on the pallet dynamically. In another example, the X axis and/or the Y axis can be utilized to perform another secondary operation directly on the pallet.

Figure 3:
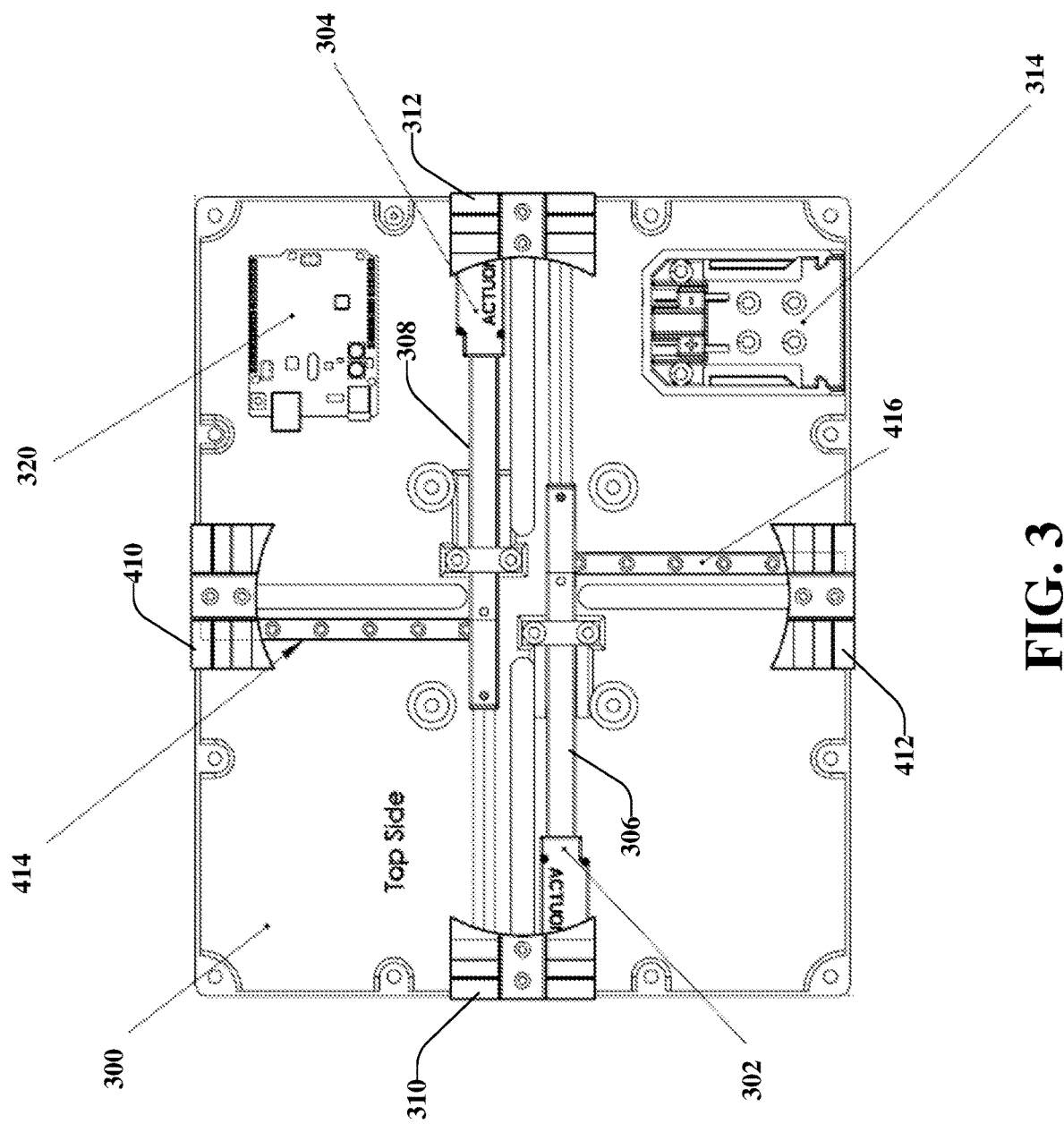
FIG. 3 illustrates an example, non-limiting, top view of a modular nest carrier in accordance with one or more embodiments described herein.

FIG. 3 illustrates an example, non-limiting, top view of a modular nest carrier 300 in accordance with one or more embodiments described herein. Repetitive description of like elements employed in other embodiments described herein is omitted for sake of brevity. The modular nest carrier 300 can comprise one or more of the components and/or functionality of the modular nest carrier 110, and vice versa.

As illustrated the modular nest carrier 300 includes a first actuator 302 and a second actuator 304. The first actuator 302 and the second actuator 304 can operate as a single unit (e.g., the first actuator 202) according to some implementations. However, in some implementations, the first actuator 302 and the second actuator 304 can operate independently. For example, the first actuator 302 can cause a first gripping arm 306 to move a first defined distance. Further, the second actuator 304 can cause a second gripping arm 308 to move a second defined distance. The first distance and the second distance can be a same distance, a similar distance, or different distances.

The first gripping arm 306 and the second gripping arm 308 can move backward and/or forward along a first direction (e.g., horizontal direction of FIG. 3). For example, movement of the first gripping arm 306 in a forward direction (e.g., left to right) causes a product contact portion 310 to move from a leftmost position (e.g., retracted position) toward a middle area of the modular nest carrier 300 (e.g., extended position). Movement of the first gripping arm 306 in a backward direction (e.g., right to left) causes the product contact portion 310 to move from a middle area of the modular nest carrier 300 (e.g., extended position) toward the leftmost position (e.g., retracted position). In a similar manner, movement of the second gripping arm 308 in the second direction (e.g., right to left) causes a product contact portion 312 to move from a rightmost position (e.g., retracted position) toward a middle area of the modular nest carrier 300 (e.g., extended position). Movement of the second gripping arm 308 in the first direction (e.g., left to right) causes the product contact portion 312 to move from a middle area of the modular nest carrier 300 (e.g., extended position) toward the rightmost position (e.g., retracted position).

Also illustrated is a control unit 320. According to some implementations, the control unit 320 can be, or can include a microprocessor and a Wi-Fi board.

Figure 4:
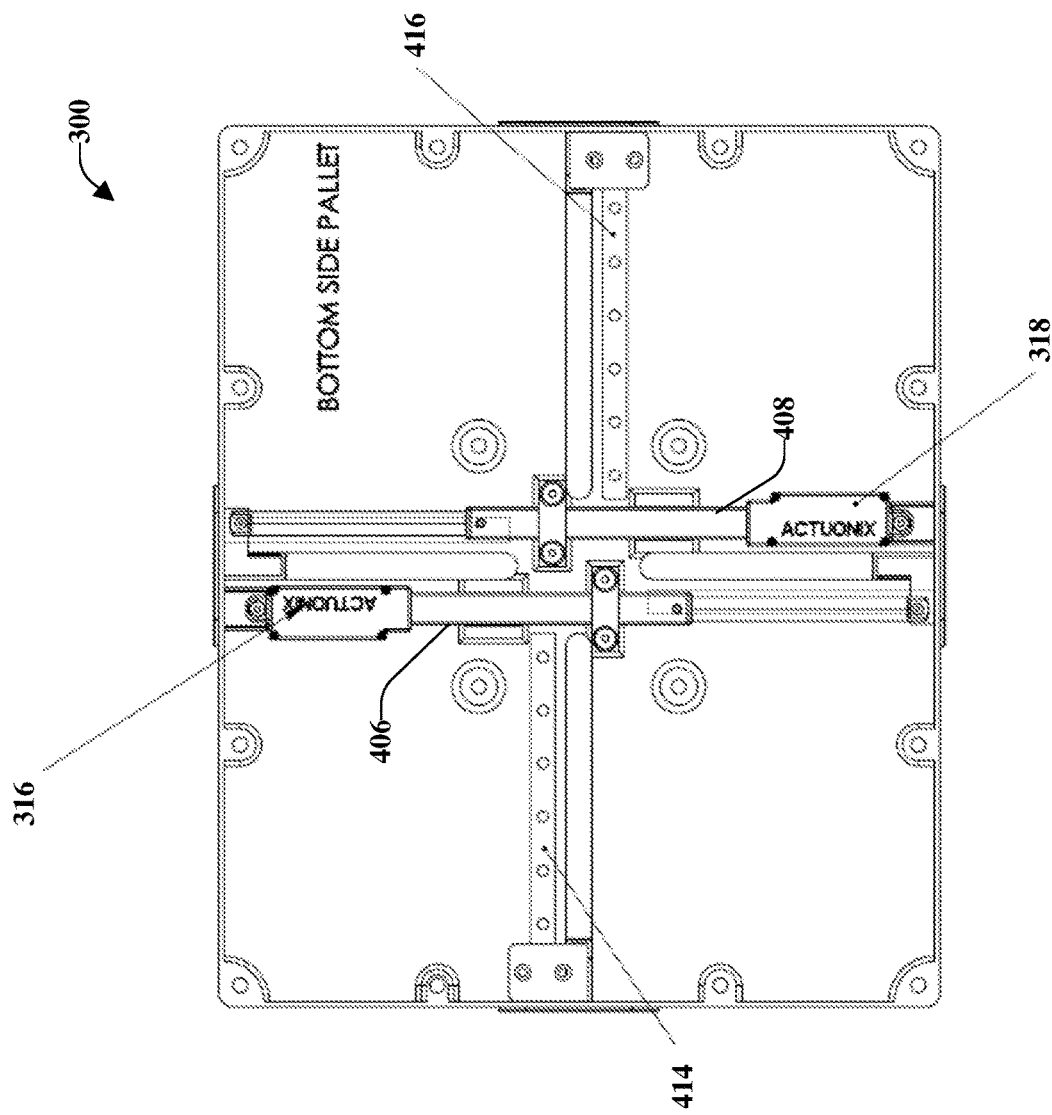
FIG. 4 illustrates an example, non-limiting, bottom view of a modular nest carrier in accordance with one or more embodiments described herein.

With reference also to FIG. 4, illustrated is an example, non-limiting, bottom view of the modular nest carrier 300 in accordance with one or more embodiments described herein. Repetitive description of like elements employed in other embodiments described herein is omitted for sake of brevity.

One or more slides can be operatively attached to the gripping arms and can be configured to guide the gripping arms. Illustrated are a first slide 316 operatively attached to the first gripping arm 306 and a second slide 318 operatively attached to the second gripping arm 308. According to some implementations, the first slide 316 and the second slide 318 are linear slides.

As illustrated the modular nest carrier 300 includes a third actuator 402 and a fourth actuator 404. The third actuator 402 and the fourth actuator 404 can operate as a single unit (e.g., the second actuator 204) according to some implementations. However, in some implementations, the third actuator 402 and the fourth actuator 404 can operate independently. For example, the third actuator 402 can cause a third gripping arm 406 to move a third defined distance. Further, the fourth actuator 404 can cause a fourth gripping arm 408 to move a fourth defined distance. The third distance and the fourth distance can be a same distance, a similar distance, or different distances.

The third gripping arm 406 and the fourth gripping arm 408 can move backward and/or forward along a second direction (e.g., vertical directions of FIG. 3 and FIG. 4). For example, movement of the third gripping arm 406 in a forward direction (e.g., from top of FIG. 3 towards bottom of FIG. 3) causes a product contact portion 410 to move from a start position (e.g., indicated at the top of FIG. 3 as a retracted position) toward a middle area (e.g., extended position) of the modular nest carrier 300. Movement of the third gripping arm 406 in a backward direction (e.g., from the middle area to the top of FIG. 3) causes the product contact portion 410 to move from a middle area (e.g., extended position) of the modular nest carrier 300 toward the topmost position (e.g., the retracted position). In a similar manner, movement of the fourth gripping arm 408 in the forward direction (e.g., from bottom of FIG. 3 towards top of FIG. 3) causes a product contact portion 412 to move from a start position (e.g., retracted position indicated at the bottom of FIG. 3) toward a middle area of the modular nest carrier 300 (e.g., extended position). Movement of the fourth gripping arm 408 in the backward direction (e.g., from the middle area to the bottom of FIG. 3) causes the product contact portion 412 to move from a middle area of the modular nest carrier 300 (e.g., extended position) toward the bottommost position of FIG. 3 (e.g., retracted position).

One or more slides can be operatively attached to the gripping arms and can be configured to guide the gripping arms. Illustrated are a third slide 414 operatively attached to the third gripping arm 406 and a fourth slide 416 operatively attached to the fourth gripping arm 408. According to some implementations, the third slide 414 and the fourth slide 416 are linear slides.

In various implementations, the respective directions of movement of the gripping arms can be the first direction (e.g., an X direction), the second direction (e.g., a Y direction), and/or other directions (e.g., a Z direction). The directions can be parallel directions, perpendicular directions, or other directions (transverse).

With continuing reference to FIG. 3, the modular nest carrier 300 includes a power source 314 (e.g., the rechargeable power source 106 of FIG. 1) that is mounted to the platform. The power source 314 can be a rechargeable power source, according to some implementations. In an example, the rechargeable power source can include one or more rechargeable batteries. In another example, the power source 314 can be a quick-change plug type battery or battery pack. According to some implementations, the power source 314 can be recharged remotely via one or more inductive charging stations along the conveyor system. In some implementations, the power source can mount to a platform external to the modular nest carrier 300, as illustrated by the rechargeable power source 106 of FIG. 1.

Figure 5:
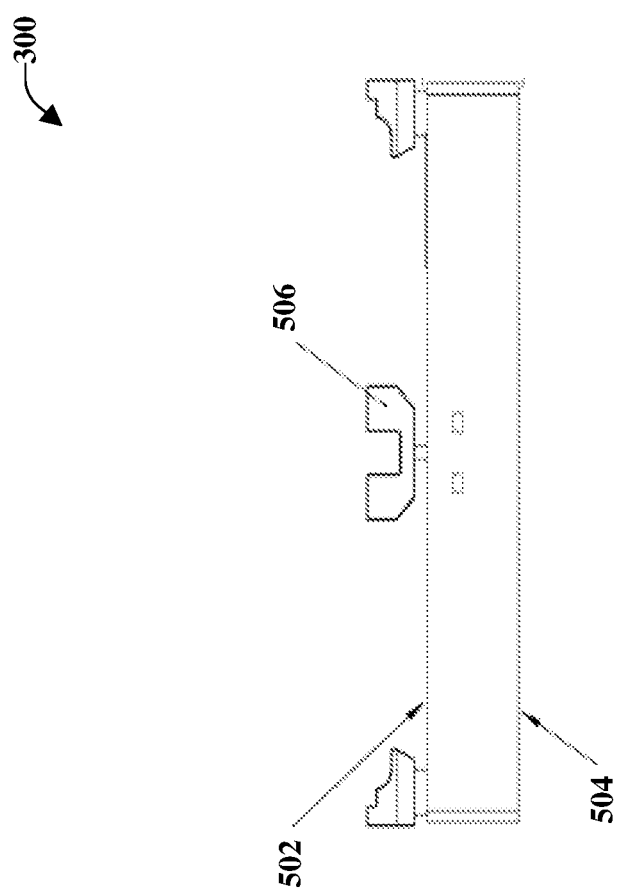
FIG. 5 illustrates an example, non-limiting, side view of a modular nest carrier in accordance with one or more embodiments described herein.

FIG. 5 illustrates an example, non-limiting, side view of a modular nest carrier 300 in accordance with one or more embodiments described herein. Repetitive description of like elements employed in other embodiments described herein is omitted for sake of brevity.

A first cover plate 502 (e.g., a top cover plate) can be placed over the modular nest carrier 300 in order to protect the internal components (e.g., the power source 314, the control unit 320, and so on). Further, a second cover plate 504 (e.g., a bottom cover plate) can be positioned under the modular nest carrier 300 to protect the conveyor belt and/or the modular nest carrier 300. A thickness of the modular nest carrier 300 can be selected such that the one or more gripping arms do not protrude above the modular nest carrier 300. However, in some implementations, the gripping arms could protrude above the modular nest carrier. In an alternative, or additional, implementation, the thickness of the modular nest carrier 300 can be selected such that the products can be placed fully within the modular nest carrier 300. However, in some implementations, one or more products might extend above the modular nest carrier 300 while being secured by the one or more gripping arms as discussed herein.

As illustrated, the gripping arms can include one or more fingers 506 (one of which is illustrated in FIG. 5). The one or more fingers 506 can be configured to operatively engage the product in order to secure and/or manipulate the product.

According to example, non-limiting, implementations, the overall dimensions of the platform can be 330 millimeter (mm) long by 270 mm wide by 54 mm thick. However, other size platforms can be utilized, and the dimensions discussed herein are provided merely as a non-limiting example. The overall chassis and covers of the nest can be printed or manufactured based on a three-dimensional (3D) printing process. For example, the chassis and covers can be 3D printed from a computer-aided design (CAD) model, a 3D model, or another type of model. The 3D printing can be performed using "Onyx," which includes nylon material mixed with chopped carbon fiber material (e.g., a carbon fiber nylon mixed material). However, other materials can be utilized for the 3D printing according to some implementations.

In some implementations, the internal components of the carrier (e.g., the modular nest carrier 300) can include four linear servo actuators. The actuators can have different stroke lengths. For example, some actuators can have a 140 mm stroke and other actuators can have a 100 mm stroke. In some embodiments, other stroke lengths can be utilized and the disclosed embodiments are not limited to a 140 mm stroke and/or a 100 mm stroke. Further, the actuators are mounted in an X-Y configuration along with precision mounted linear slides for guides. The control unit can be a micro controller according to some implementations. For example, the micro controller can be mounted inside the carrier and can wirelessly connect and control the linear actuators.

Figure 6:
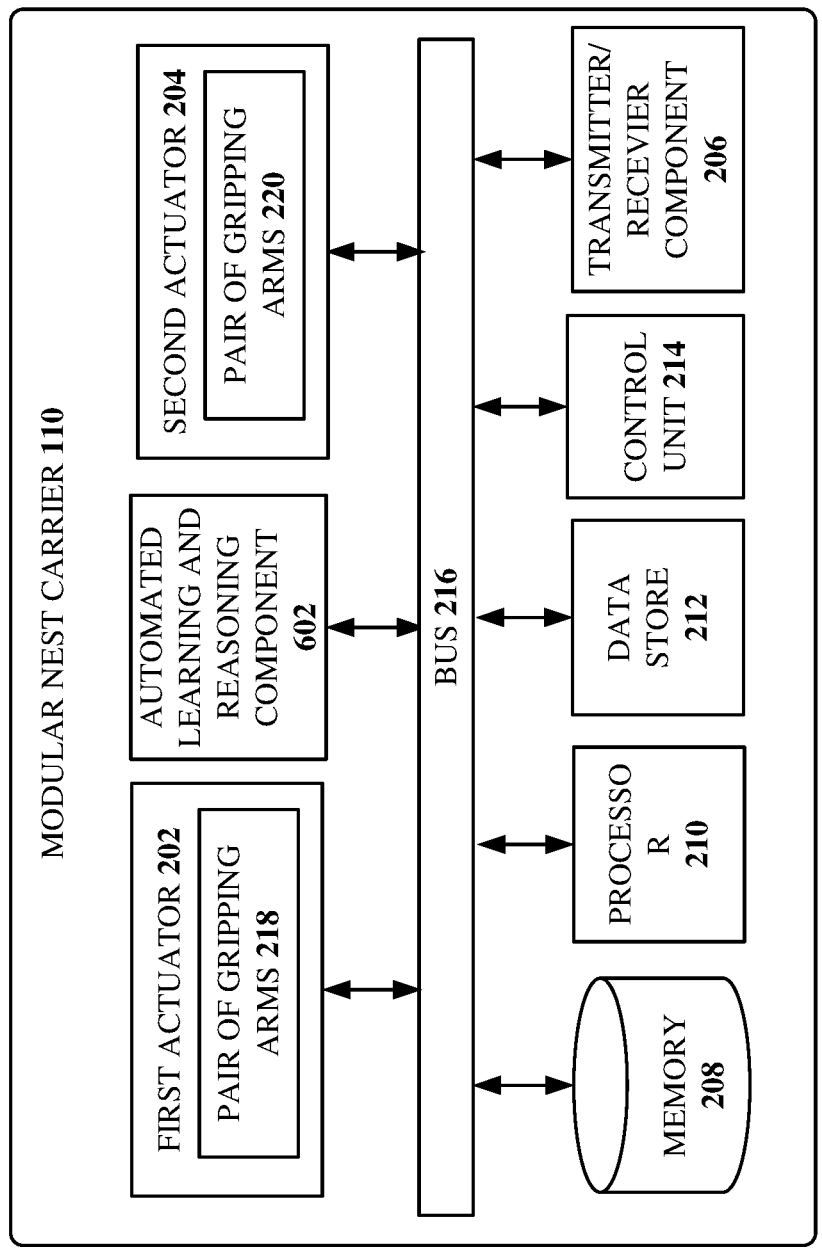
FIG. 6 illustrates an example, non-limiting, modular nest carrier that employs automated learning to facilitate one or more of the disclosed aspects in accordance with one or more embodiments described herein.

FIG. 6 illustrates an example, non-limiting, modular nest carrier 600 that employs automated learning to facilitate one or more of the disclosed aspects in accordance with one or more embodiments described herein. Repetitive description of like elements employed in other embodiments described herein is omitted for sake of brevity. The modular nest carrier 600 can comprise one or more of the components and/or functionality of the product assembly system 100, the modular nest carrier 110, and/or the modular nest carrier 300, and vice versa.

As illustrated, the modular nest carrier 600 can comprise an automated learning and reasoning component 602 that can be utilized to automate one or more of the disclosed embodiments. The automated learning and reasoning component 602 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the automated learning and reasoning component 602 can employ principles of probabilistic and decision theoretic inference. Additionally, or alternatively, the automated learning and reasoning component 602 can rely on predictive models constructed using automated learning and/or automated learning procedures. Logic-centric inference can also be employed separately or in conjunction with probabilistic methods.

The automated learning and reasoning component 602 can infer one or more configuration of one or more objects (e.g., products) based on time of day, time of month or year based on past history of configurations that were used at a similar time in the past (e.g., historical data). In some implementations, the automated learning and reasoning component 602 can infer one or more configurations of one or more objects based on information indicative of the object, which can be received from the control unit 214. For example, the information indicative of the object can be product information, such as an identification or model number associated with the object, a work order or purchase order associated with the object, and/or based on other identification information related to the object. Based on this knowledge that is inferred, the automated learning and reasoning component 602 can make an inference based on which configuration should be utilized to secure and/or manipulate the object.

As used herein, the term "inference" refers generally to the process of reasoning about or inferring states of a system, a component, a module, an environment, and/or objects from a set of observations as captured through events, reports, data and/or through other forms of communication. Inference can be employed to identify a specific object and/or geometry or configuration of the object, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with changing configurations, such as stroke length or distance, a number of gripping arms to utilize, an amount of force to exert, and so forth) can employ various artificial intelligence-based schemes for carrying out various aspects thereof. For example, a process for determining a particular configuration, stroke length or distance, a quantity of gripping arms to use, an amount of force to apply, and so on, can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine geometries of objects and how best to manipulate and/or secure those objects in order for such actions to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained. For example, SVMs can be configured through a learning or training phase within a classifier constructor and feature selection module. Thus, a classifier(s) can be used to automatically learn and perform a number of functions, including but not limited to determining, according to a predetermined criterion, a geometry of an object, use of one or more gripping arms and/or actuators based on the geometry of the object, and so forth. The criteria can include, but is not limited to, similar objects, historical information, information indicative of an expected object, and so forth.

Additionally, or alternatively, an implementation scheme (e.g., a rule, a policy, and so on) can be applied to control and/or regulate securing and/or manipulating one or more products having different geometries carry out actions associated with assembly of the products, and so forth. In some implementations, based upon a predefined criterion, the rules-based implementation can automatically and/or dynamically change configuration of one or more modular nests. In response thereto, the rule-based implementation can automatically interpret and carry out functions associated with the one or more modular nests by employing a predefined and/or programmed rule(s) based upon any desired criteria.

Figure 7:
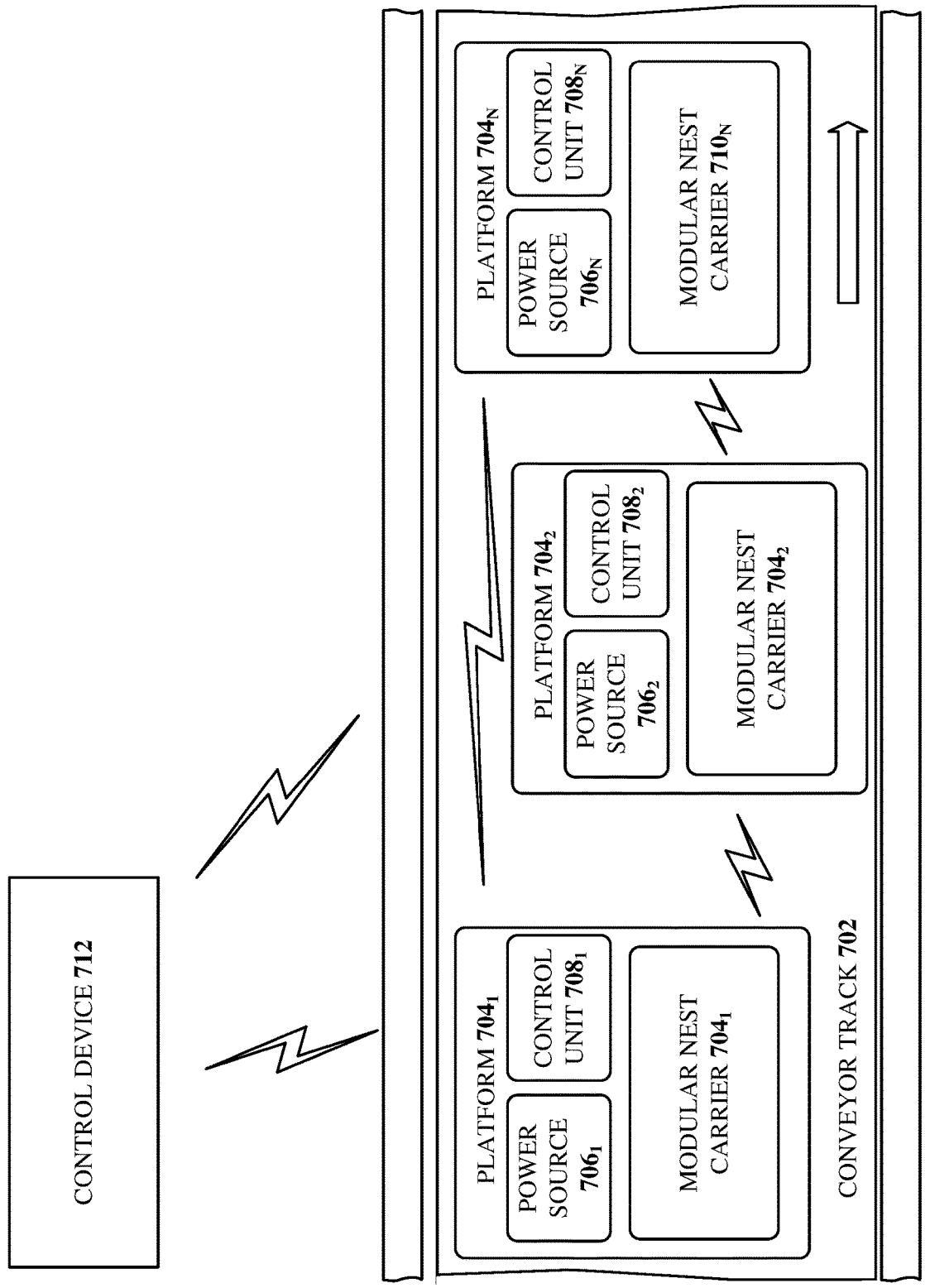
FIG. 7 illustrates an example, non-limiting, system that includes multiple nest carriers that communicate with one another as a distributed communication system in accordance with one or more embodiments described herein.

FIG. 7 illustrates an example, non-limiting, system 700 that includes multiple nest carriers that communicate with one another as a distributed communication system in accordance with one or more embodiments described herein. Repetitive description of like elements employed in other embodiments described herein is omitted for sake of brevity. The system 700 can comprise one or more of the components and/or functionality of the product assembly system 100, the modular nest carrier 110, the modular nest carrier 300, and/or the modular nest carrier 600, and vice versa.

The system 700 can include a conveyor track 702 and one or more platforms can be operatively attached to the conveyor track 702. The one or more platforms are illustrated as a first platform 704$_1$, a second platform 704$_2$, through an Nth platform 704N, where N is an integer. The platforms can include respective power sources, illustrated as a first power source 706$_1$, a second power source 706$_2$, through an Nth power source 706N. Additionally, the platforms can include respective control units, illustrated as a first control unit 708$_1$, a second control unit 708$_2$, through an Nth control unit 708N. As illustrated, the platforms can include respective modular nest carriers, illustrated as a first modular nest carrier 710$_1$, a second modular nest carrier 710$_2$, through an Nth modular nest carrier 710N. The platforms are arranged to be moved along the conveyor track 702, as indicated by the arrow.

The platforms are configured to wirelessly communicate with one another, as needed. For example, a control device 712 can transmit a broadcast signal in order to control one or more platforms. The broadcast signal can include an identification of the platform to which the signal is directed (e.g., the intended recipient of the signal), such as in a header of the signal. Other platforms for which the signal is not intended, can read the header (e.g., via respective transmitter/receiver components) and determine that the signal is not intended for them and can ignore the signal. In some implementations, the other platforms can receive the signal even though the signal is not intended for them and, if the platform for which the signal was intended does not acknowledge the signal, one or more other platforms can retransmit the signal for the intended platform (e.g., via respective transmitter/receiver components).

For example, the modular nest carriers can form a mesh network and, based on a determination that a modular nest carrier did not receive its intended signal, one or more other nest carriers can relay the information to the non-responsive nest. According to some implementations, distributed control can be utilized to facilitate the communication between the modular nest carriers.

The respective power units can be mounted to the respective platforms. According to some implementations, power units can include one or more rechargeable batteries. In accordance with some implementations, the power units can be rechargeable via a rechargeable battery pack (e.g., a quick-change plug type battery) that can be selectively removed from the modular nest carrier and charged, such as via a wall outlet. In alternative or additional implementations, the power units can be recharged remotely via one or more inductive charging stations as the modular nest carrier is moved along the conveyor system. It is noted that although the power units can be integrated with the modular nest carrier, the disclosed embodiments are not limited to this implementation. Instead, the power units can be located external to the modular nest carrier, as illustrated. For example, the power units can be operatively connected to the platform and operatively coupled to the modular nest carrier for purposes of supplying power to the modular nest carrier.

Figure 8:
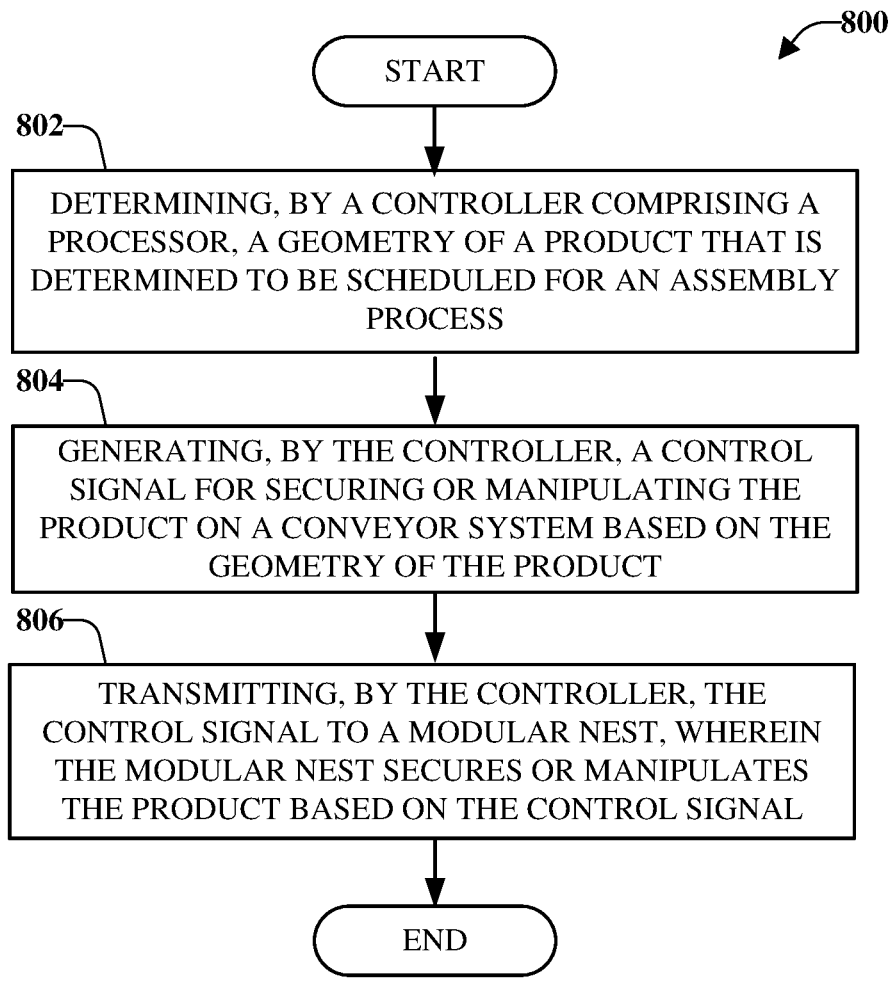
FIG. 8 illustrates a flow diagram of an example, non-limiting, computer-implemented method that facilitates selectively modifying a configuration of a robotic smart carrier nest in accordance with one or more embodiments described herein.

FIG. 8 illustrates a flow diagram of an example, non-limiting, computer-implemented method 800 that facilitates selectively modifying a configuration of a robotic smart carrier nest in accordance with one or more embodiments described herein. The computer-implemented method 800 can be implemented by the product assembly system 100, the modular nest carrier 110, the modular nest carrier 300, the modular nest carrier 600, and/or the system 700.

The computer-implemented method 800 starts at 802 when a controller comprising a processor determines a geometry of a product that is determined to be scheduled for an assembly process (e.g., via the control device 112).

At 804, the controller generates a control signal for securing or manipulating the product on a conveyor system based on the geometry of the product (e.g., via the control device 112). Further, at 806, the controller transmits the control signal to a modular nest (e.g., via the transmitter/receiver component 206). Based on the control signal, the modular nest secures or manipulates the product (e.g., via the first actuator 202, the second actuator 204, the first actuator 302, the second actuator 304, the third actuator 402, the fourth actuator 404).

According to some implementations, transmitting the control signal includes transmitting the control signal as a broadcast signal to a plurality of modular nests, including the modular nest. The broadcast signal comprises information indicative of an identification of the modular nest and is able to be retransmitted by another modular nest of the plurality of modular nests based on the control signal, transmitted by the controller, not being received at the modular nest.

According to some implementations, transmission of the control signal can include transmitting first instructions to control movement of a first pair of gripping arms and transmitting second instructions to control movement of a second pair of gripping arms.

As discussed herein, provided is a conveyor system that holds different sized products via one or more nests. The one or more nests are controlled via wireless communication to hold, secure, and/or manipulate the products. The nests can be configured in different forms in order to hold different products. Such configuration of the nests can be performed automatically based on activation of one or more actuators.

Example Operating Environment

Figure 9:
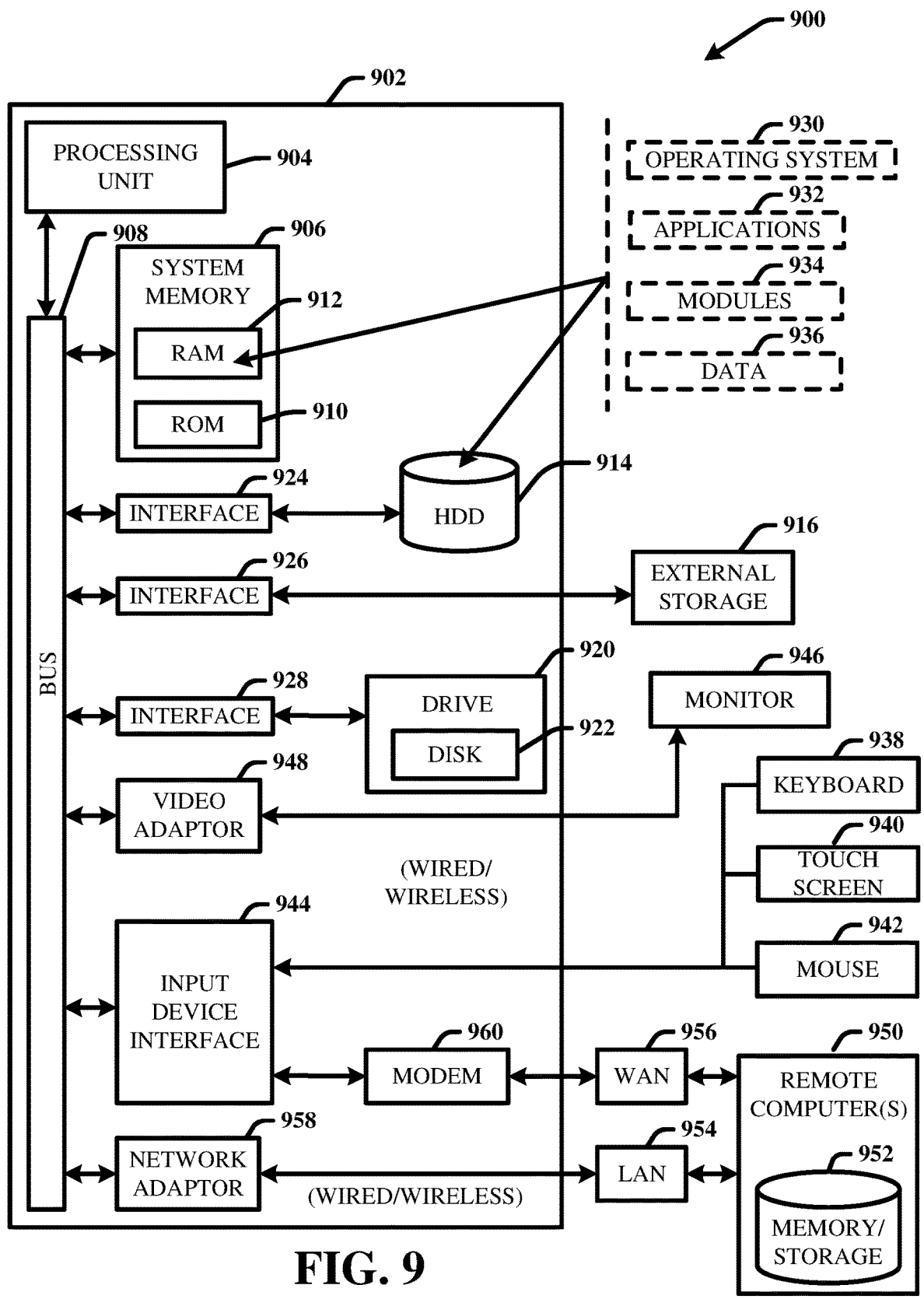
FIG. 9 illustrates a block diagram of an example, non-limiting operating environment in which one or more embodiments described herein can be facilitated.

In order to provide additional context for various embodiments described herein, FIG. 9 and the following discussion are intended to provide a general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media. Computer-readable storage media or machine-readable storage media can be any available storage media that can be accessed by the computer and includes both volatile and nonvolatile media, removable and non-removable media. By way of non-limiting example, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942, microphone, a stylus pen, an image input device, e.g., camera(s), a sensor input device, a biometric input device and the like. These and other input devices are often connected to the processing unit 904 through an input device interface 944 that can be coupled to the system bus 908 but can be connected by other known interfaces.

A monitor 946 or other type of display device can be also connected to the system bus 908 via an interface, such as a video adapter 948. A computer also typically includes other peripheral output devices such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Combinations

Further aspects of the invention are provided by the subject matter of the following paragraphs:

A. A product assembly system (100), comprising:
  a conveyor track (102) configured to move a platform (104);
  a rechargeable power source (106) mounted to the platform;
  a control unit (108) mounted to the platform and powered by the rechargeable power source; and
  a modular nest (110) mounted to the platform and configured to secure or manipulate a product during assembly, wherein the control unit sends, to the modular nest, a signal based on a geometry of the product, and wherein the modular nest secures or manipulates the product based on the signal.

B. The product assembly system according to any Paragraph A, wherein the modular nest comprises a first actuator with a first pair of gripping arms that open and close in a first direction based on the signal from the control unit.

C. The product assembly system according to Paragraph B, wherein the first actuator is a linear servo actuator.

D. The product assembly system according to any one of Paragraph B or C, wherein the first pair of gripping arms maintain positioned within the platform.

E. The product assembly system according to any one of Paragraph B, C or D wherein the first pair of gripping arms do not contact the conveyor track.

F. The product assembly system according to any one of Paragraphs B-E, wherein the modular nest comprises a second actuator with a second pair of gripping arms that open and close in a second direction transverse to the first direction based on the signal from the control unit.

G. The product assembly system according to any one of Paragraphs A-F, wherein the second actuator is a linear servo actuator.

H. The product assembly system according to any one of Paragraph A-F, further comprising a wireless transmitter that sends data to a control circuit.

I. The product assembly system according to any one of Paragraph A-H, wherein the modular nest comprises a wireless receiver that receives, from a transmitter, a master signal regarding the geometry of the product to be assembled.

J. The product assembly system according to any one of Paragraph A-I, further comprising an inductive charging station configured to charge the rechargeable power source.

K. The product assembly system according to any one of Paragraph A-J, wherein the product is a first product, wherein the signal is a first signal, wherein the geometry is a first geometry, and wherein the modular nest is further configured to secure or manipulate a second product during assembly.

L. The product assembly system of Paragraph K, wherein the control unit sends a second signal to the modular nest based on a second geometry of the second product, wherein the first geometry and the second geometry are different geometries, and wherein the modular nest secures or manipulates the second product based on the second signal.

M. The product assembly system according to any one of Paragraph A-L, wherein the modular nest is a first modular nest, wherein the product is a first product, wherein the signal is a first signal, wherein the geometry is a first geometry, and wherein the product assembly system further comprises:
  a second modular nest mounted to the platform and configured to secure or manipulate a second product during the assembly N. The product assembly system of Paragraph M, wherein the control unit sends, to the second modular nest, a second signal based on a second geometry of the second product, wherein the first product and the second product comprise different geometries, and wherein the second modular nest secures or manipulates the second product based on the second signal.

O. The product assembly system according to any one of Paragraph A-N, further comprising:
  two or more modular nests, including the modular nest, wherein the two or more modular nests are configured to communicate with one another as a distributed communication system.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" The term "about" should be construed as within standard manufacturing and measuring tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A product assembly system, comprising:
  a platform;
  a conveyor track configured to move the platform;
  a rechargeable power source mounted to the platform;
  a control unit mounted to the platform and powered by the rechargeable power source; and
  a modular nest mounted to the platform and configured to secure or manipulate a product during assembly, wherein the control unit is configured to send, to the modular nest, a signal based on a geometry of the product, and wherein the modular nest is configured to secure or manipulate the product based on the signal.

2. The product assembly system of claim 1, wherein the modular nest comprises a first actuator with a first pair of gripping arms that open and close in a first direction based on the signal from the control unit.

3. The product assembly system of claim 2, wherein the first pair of gripping arms maintain positioned within the platform.

4. The product assembly system of claim 2, wherein the first pair of gripping arms do not contact the conveyor track.

5. The product assembly system of claim 2, wherein the modular nest comprises a second actuator with a second pair of gripping arms that open and close in a second direction transverse to the first direction based on the signal from the control unit.

6. The product assembly system of claim 2, wherein the first actuator is a linear servo actuator.

7. The product assembly system of claim 1, further comprising a wireless transmitter that sends data to a control circuit.

8. The product assembly system of claim 1, wherein the modular nest comprises a wireless receiver that receives, from a transmitter, a master signal regarding the geometry of the product to be assembled.

9. The product assembly system of claim 1, further comprising an inductive charging station configured to charge the rechargeable power source.

10. The product assembly system of claim 1, wherein the product is a first product, wherein the signal is a first signal, wherein the geometry is a first geometry, wherein the modular nest is further configured to secure or manipulate a second product during assembly, wherein the control unit is configured to send a second signal to the modular nest based on a second geometry of the second product, wherein the first geometry and the second geometry are different geometries, and wherein the modular nest is configured to secure or manipulate the second product based on the second signal.

11. The product assembly system of claim 1, wherein the modular nest is a first modular nest, wherein the product is a first product, wherein the signal is a first signal, wherein the geometry is a first geometry, and wherein the product assembly system further comprises:

a second modular nest mounted to the platform and configured to secure or manipulate a second product during the assembly, wherein the control unit is configured to send, to the second modular nest, a second signal based on a second geometry of the second product, wherein the first product and the second product comprise different geometries, and wherein the second modular nest is configured to secure or manipulate the second product based on the second signal.

* * * * *